United States Patent
Campbell et al.

(10) Patent No.: US 7,068,682 B2
(45) Date of Patent: Jun. 27, 2006

(54) SIGNAL DISTRIBUTION WITHIN CUSTOMER PREMISES

(75) Inventors: Kurt A. Campbell, Lafayette, CO (US); Bruce A. Phillips, Highlands Ranch, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 10/852,086

(22) Filed: May 24, 2004

(65) Prior Publication Data

US 2004/0233860 A1  Nov. 25, 2004

Related U.S. Application Data

(63) Continuation of application No. 09/514,727, filed on Feb. 28, 2000, now abandoned.

(51) Int. Cl.
*H04J 1/00* (2006.01)

(52) U.S. Cl. ........................ 370/487; 725/128

(58) Field of Classification Search ........ 370/220, 370/419, 480, 485–488, 493–497, 465, 468, 370/473, 482, 501; 709/249; 710/62, 65, 710/69, 72, 73; 725/109, 118, 120, 131, 725/133, 143, 105, 111, 114, 121, 144, 147–149, 725/128, 87
See application file for complete search history.

(56) References Cited

U.S. PATENT DOCUMENTS

| | | | | |
|---|---|---|---|---|
| 5,150,365 | A | * | 9/1992 | Hirata et al. ................ 370/487 |
| 5,425,027 | A | * | 6/1995 | Baran ...................... 370/395.6 |
| 5,448,635 | A | * | 9/1995 | Biehl et al. ............ 379/399.02 |
| 5,870,395 | A | * | 2/1999 | Baran ...................... 370/395.1 |
| 6,418,149 | B1 | * | 7/2002 | Swisher et al. ............. 370/487 |
| 6,510,152 | B1 | * | 1/2003 | Gerszberg et al. .......... 370/352 |

* cited by examiner

*Primary Examiner*—Chi Pham
*Assistant Examiner*—Dmitry Levitan
(74) *Attorney, Agent, or Firm*—Brooks Kushman P.C.

(57) ABSTRACT

Data signals from a telecommunication network are routed to a gateway which generates analog signal distributed to receivers within a customer premises. A network interface device receives digital signals from the telecommunication network. A first diplexer has a digital signal port connected to the network interface device. The first diplexer combined signal port is connected with the combined signal port of a second diplexer. The gateway receives digital signals from the second diplexer digital signal port and provides analog signals to the second diplexer analog signal port. Analog signals are then available to receivers at both the first diplexer analog signal port and the second diplexer analog signal port.

19 Claims, 3 Drawing Sheets

SIGNAL DISTRIBUTION WITHIN CUSTOMER PREMISES

CROSS-REFERENCE TO RELATED APPLICATIONS

This application is a continuation of U.S. application Ser. No. 09/514,727 filed Feb. 28, 2000 now abandoned.

TECHNICAL FIELD

The present invention relates to routing analog and digital information within customer premises.

BACKGROUND ART

Customers have an increasing selection of sources for information, entertainment, and communication services. These sources offer a variety of data formats carried over many types of media, including twisted pair, coaxial cable, fiber, radio waves, and the like. Customer premises that were once wired for at most two formats, standard telephone and cable TV, are now often rewired to accommodate new data formats and media.

An example is a customer wired for traditional point-to-multipoint broadband reception, commonly known as cable TV. Such a customer typically has coaxial cable running from a network connection point to locations where analog receivers may be located. When high speed digital data, such as provided by VDSL, becomes available, the customer premises must be wired with additional cabling. Typically, twisted pair is run from the network connection point to a gateway. The gateway converts digital signals into a format acceptable to one or more receivers within the customer premises. A principle factor in the cost of adding a service such as VDSL is the installment of new wiring to the gateway and from the gateway to receivers.

What is needed is to efficiently route analog and digital signals within customer premises. As much as possible, the existing cabling should be used. Any reuse of existing cabling should not require modifications to network interface devices or gateways. Also, cable reuse should be simple so as to keep digital service installation costs to a minimum.

DISCLOSURE OF INVENTION

It is an object of the present invention to reuse existing cabling to provide digital signal services.

It is another object of the present invention to distribute data signals to analog receivers within customer premises.

It is still another object of the present invention to distribute VDSL signals received over a first media form as analog signals over a second media form.

It is yet another object of the present invention to use customer premises coaxial cable to distribute analog video signals based on received VDSL signals.

In carrying out the above objects and other objects and features of the present invention, a system for distributing data signals from a telecommunication network to analog signal receivers within customer premises is provided. A network interface device receives digital signals from the telecommunication network. A first diplexer has a digital signal port connected to the network interface device. The first diplexer combined signal port is connected with the combined signal port of a second diplexer. A gateway receives digital signals from the second diplexer digital signal port and provides analog signals to the second diplexer analog signal port. Analog signals are available for receivers at both the first diplexer analog signal port and the second diplexer analog signal port.

In an embodiment of the present invention, multiple receivers are connected to the first diplexer analog signal port through one or more splitters.

In another embodiment of the present invention, one or more receivers are connected to the analog output of the gateway through one or more splitters.

In still another embodiment of the present invention, the network interface device network connection point provides a twisted pair connection. A balun accepts the twisted pair connection and provides a coaxial cable output for the first diplexer digital signal port. Similarly, the second diplexer digital signal port outputs coaxial cable to a balun supplying a twisted pair connection to the gateway digital signal input port.

In a further embodiment of the present invention, digital data signals are VDSL signals and analog signals are radio frequency signals.

A system for distributing analog video signals to receivers within a customer premises is also provided. VDSL signals are provided to the customer premises over a first media form from the network interface device. A gateway within the customer premises generates analog video signals for distribution over a second media form from VDSL signals received over the first media form. A first interface means accepts VDSL signals over the first media form and provides VDSL signals over the second media form. A first filtering means accepts VDSL signals at a digital signal port and provides the VDSL signals at a combined signal port. The first filtering means further accepts analog video signals at the combined signal port and provides the analog video signals at an analog signal port. The first filtering means is connected with the first interface means through the digital signal port. At least one receiver may be connected through the first filtering means analog signal port. A second filtering means accepts analog video signals at an analog signal port and provides the analog video signals at a combined signal port. The second filtering means accepts VDSL signals at the combined signal port and provides digital signals at a digital signal port. The combined signal ports of the first filtering means and second filtering means are connected. A second interface means accepts VDSL from the second interface means digital signal port over the second media form. The second interface means provides the VDSL signals to the gateway over the first media form. A splitter means accepts analog video signals from the gateway and provides the video signals to the second filtering means analog signal port as well as to at least one receiver.

In an embodiment of the present invention, the first media form is twisted pair wiring and the second media form is coaxial cable.

A method is provided for distributing information signals from a telecommunication network to at least one analog signal receiver within a customer premises. High frequency information signals are received formatted for a first medium. The received signals are formatted for a second medium and transmitted over existing cabling of the second medium. The transmitted signs are converted for the first medium and decoded into analog signals. The analog signals are then transmitted over the existing cabling of the second medium.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
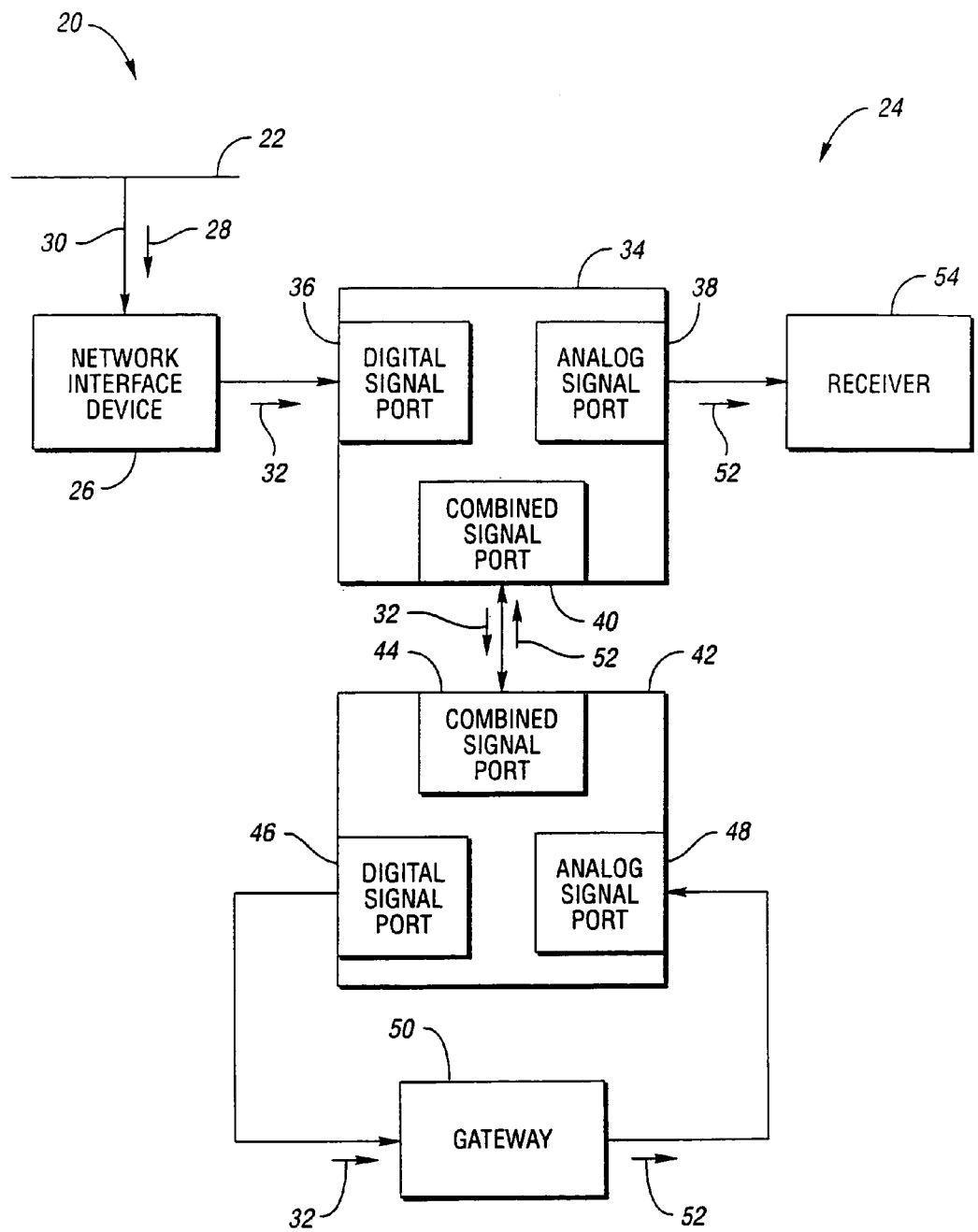
FIG. 1 is a schematic drawing of a system for distributing data signals from a telecommunication network according to an embodiment of the present invention.

Referring to FIG. 1, a schematic drawing of a system for distributing data signals from a telecommunication network according to an embodiment of the present invention is shown. A data signal distribution system, shown generally by 20, includes telecommunication network 22 providing information to a plurality of customer premises, one of which is indicated by 24. Customer premises 24 includes network interface device 26 receiving digital signals 28 from telecommunication network 22 through network connection point 30. Network interface device 26 may provide several services. First, network interface device 26 electrically isolates customer premises 24 from the remainder of distribution system 20, reducing the possibility that voltage transients on telecommunication network 22 will damage customer premises equipment. Network interface device 26 may also serve as a bridge to permit standard telephone signals (POTS) to pass between telecommunication network 22 and POTS equipment within customer premises 24. Network interface device 26 may also serve as an address recognizer, accepting only those signals on telecommunication network 22 designated for customer premises 24. Further, network interface device 26 accepts digital signals 28 from telecommunication network 22, formatting digital signals 28 to the requirements of customer premises equipment. In a preferred embodiment, digital signals 28 include VDSL signals. Network interface device 26 outputs digital signals 32 to first diplexer 34.

First diplexer 34 includes digital signal port 36, analog signal port 38, and combined signal port 40. Diplexer 34 passes analog signals between analog signal port 38 and combined signal port 40. Diplexer 34 also passes digital signals between digital signal port 36 and combined signal port 40. Second diplexer 42 includes combined signal port 44 in communication with combined signal port 40 on first diplexer 34. Second diplexer 42 also includes digital signal port 46 and analog signal port 48.

Both first diplexer 34 and second diplexer 42 operate in substantially the same manner. Each diplexer 34, 42 is a means of filtering signals between combined signal port 40, 44 and either digital signal port 36, 46 or analog signal port 38, 48, respectively. If digital signals 32 are VDSL signals, diplexers 34, 42 filter signals below approximately 50 MHz out of the path between combined signal port 40, 44 and digital signal port 36, 46. Signals below 50 MHz are passed between combined signal port 40, 44 and analog signal port 38, 48. First diplexer 34 and second diplexer 42 may be a model 750-0154 diplexer from Next Level Communications, Inc. of Rohnert Park, Calif.

Gateway 50 accepts digital signals 32 from digital signal port 46 of second diplexer 42. Gateway 50 extracts information, such as video, audio, and the like, from digital signals 32 to produce analog signals 52. Typically, analog signals 52 are modulated to the VHF channel spectrum.

Analog signals 52 from gateway 50 are received by analog signal port 48 in second diplexer 42. Analog signals 52 are passed to combined signal port 44 in second diplexer 42 and are received by combined signal port 40 in first diplexer 34. Analog signals 52 are passed to analog signal port 38 in first diplexer 34. Receiver 54 connected to analog signal port 38, 48 may then receive analog signals 52. Receiver 54 may be, for example, an analog television set, a personal computer, a stereo, a recording device, or the like.

Figure 2:
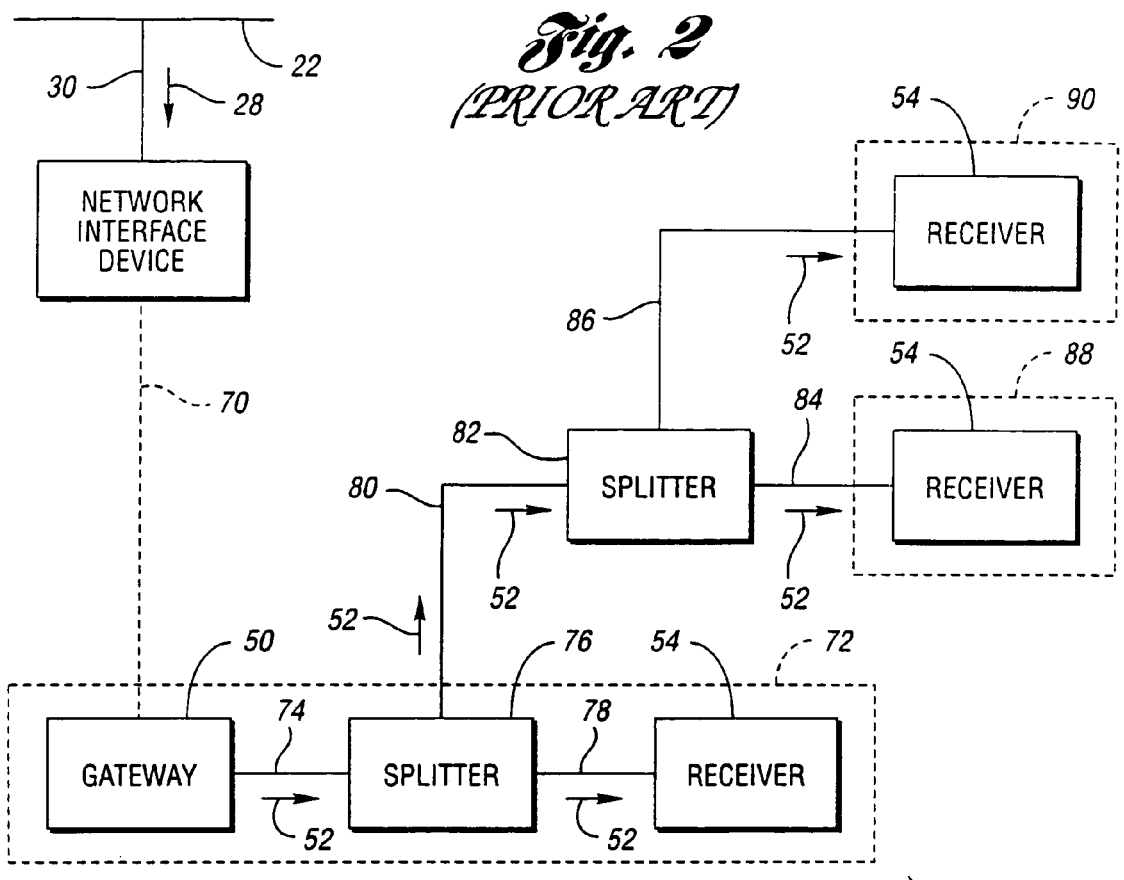
FIG. 2 is a schematic diagram illustrating a prior art system for distributing analog signals.

Referring now to FIG. 2, a schematic diagram illustrating a prior art system for distributing analog signals is shown. In previous systems, network interface device 26 would accept digital signals 28 from network 22 over network connection point 30 and produce digital signals 32 output over twisted pair cabling 70 to gateway 50. Network interface device 26 was typically located close to the point on customer premises 24 where network connection point 30 entered into the building housing network interface device 26. Gateway 50, however, was typically located in room 72 remote from network interface device 26. Hence, twisted pair 70 needed to be routed through customer premises 24 between gateway 50 and network interface device 26.

In addition, further cable had to be routed if multiple receivers 54 were to be used at various locations within customer premises 24. In the example shown in FIG. 2, analog signals 52 are output from gateway 50 on coaxial cable 74. Splitter 76 accepts analog signals 52 on coaxial cable and outputs analog signal 52 on coaxial cables 78, 80. Receiver 54 in room 72 receives analog signals 52 through coaxial cable 78. Splitter 82 receives analog signals 52 over coaxial cable 80 and provides analog signals 52 on coaxial cables 84, 86. Receivers 54 in rooms 88, 90 receive analog signals 52 over coaxial cables 84, 86, respectively.

Figure 3:
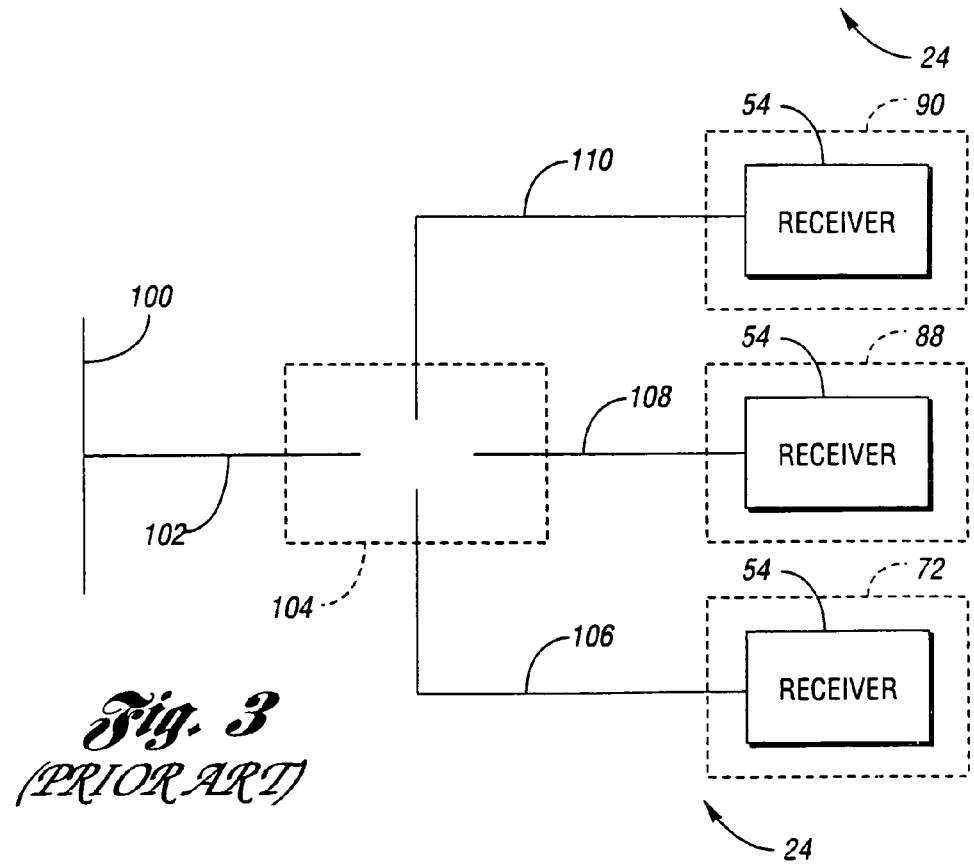
FIG. 3 is a schematic diagram illustrating a prior art system for coaxial cable routing in a customer premises.

Referring now to FIG. 3, a schematic diagram illustrating a prior art system for coaxial cable routing in a customer premises is shown. Many customer premises 24 are currently wired to receive cable television. Cable distribution system network 100 provides cable drop 102 into customer premises 24. Cable drop 102 typically runs to room 104, located near drop 102, from which coaxial cables 106, 108, 110 run to various room 72, 88, 90 respectively within customer premises 24. When receiver 54 is to be connected to cable distribution system 100, cable drop 102 is connected to coaxial cable 106, 108, 110 running to the room 72, 88, 90 in which receiver 54 will be placed. The connection between drop 102 and cable 106, 108, 110 may be direct or may be through an amplifier.

Figure 4:
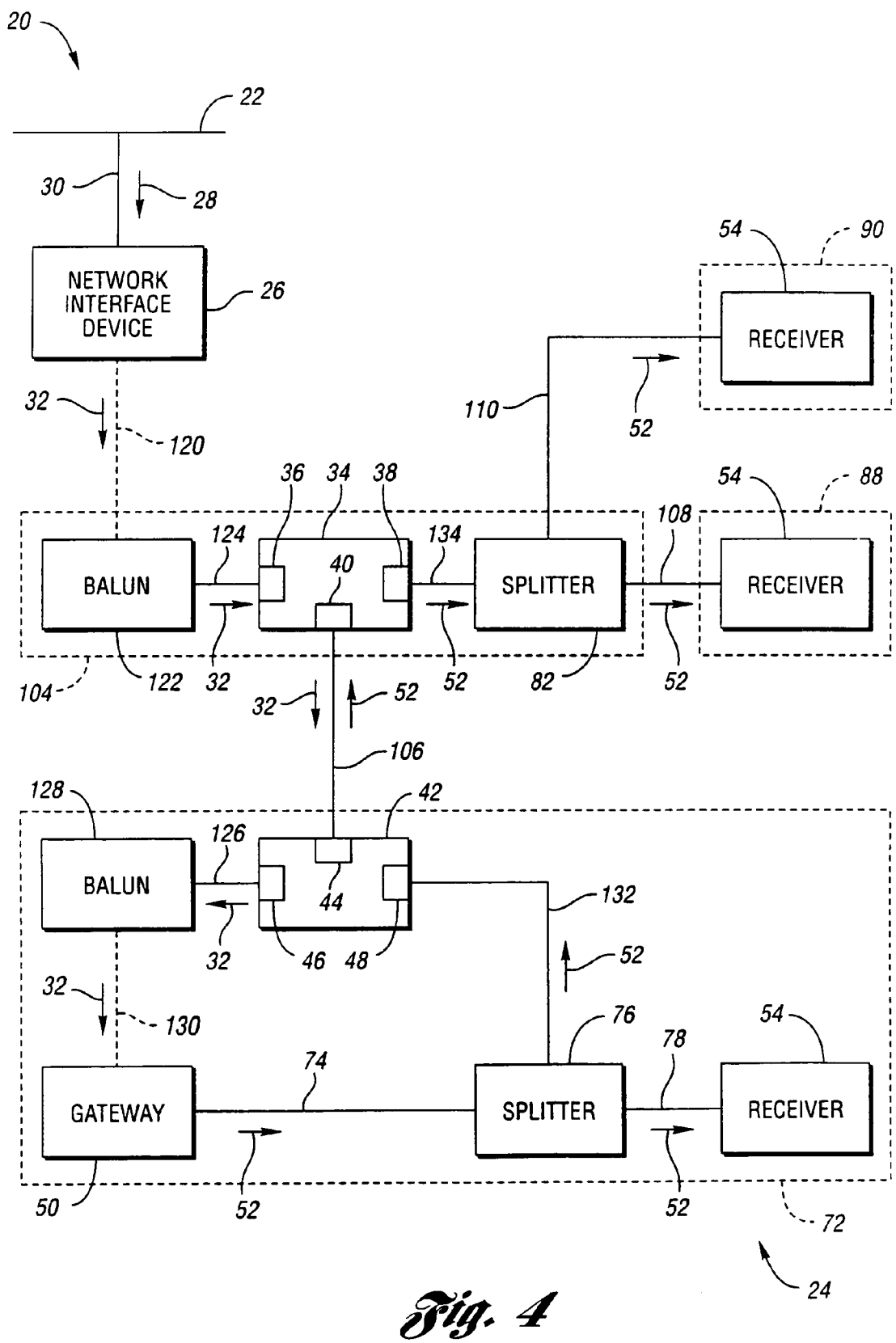
FIG. 4 is a schematic diagram of a system for distributing analog and digital signals throughout customer premises.

Referring now to FIG. 4, a schematic diagram of a system for distributing analog and digital signals throughout customer premises according to an embodiment of the present invention is shown. Network interface device 26 outputs digital signals 32 on short twisted pair cabling 120. Balun 122 accepts digital signals 32 on twisted pair 120 and outputs digital signals 32 on coaxial cable 124. Balun 122 may be made part of network interface device 26 in which case coaxial cable 124 can be implemented with existing coaxial cable 102. First diplexer 34 accepts digital signals 32 on coaxial cable 124 and outputs digital signals 32 on existing coaxial cable 106. Combined signal port 44 in second diplexer 42 receives digital signals 32 over coaxial cable 106 and outputs digital signals 32 over short coaxial cable 126 to balun 128. Second diplexer digital signal port 46 outputs digital signals 32 on short coaxial cable 126 to balun 128 which outputs digital signals 32 on short twisted pair cabling 130. Twisted pair cabling 130 may be an EIA/TIA 568A jumper.

Gateway 50 accepts digital signals 32 and generates analog signals 52 on coaxial cable 74. If no receiver 54 is to be placed near gateway 50, coaxial cable 74 is connected to analog signal port 48 of second diplexer 42. If receiver 54 is to be placed in room 72, coaxial cable 74 is fed into splitter 76 with one output of splitter 76 feeding analog signals 52 through coaxial cable 78 to receiver 54 and the other output of splitter 76 feeding analog signals 52 through short coaxial cable 132 to analog signal port 48 of second diplexer 42.

If additional receivers 54 are desired in rooms 88, 90, analog signal 52 is supplied by analog signal port 38 of first diplexer 34 over short coaxial cable 134 to splitter 82. Analog signal 52 is carried over existing coaxial cable 108, 110 to receivers 54 in rooms 88, 90, respectively.

Baluns 122, 128 are an interface means for connecting one media form to another media form. In the example described, one media form is twisted pair wires and the other media form is coaxial cable. In embodiments of the present invention, balun 122 may be incorporated into network interface device 26 or digital signal port 36 of first diplexer 34. Similarly, balun 128 may be incorporated into digital signal port 46 of second diplexer 42 or into gateway 50. Either balun 122, 128 may also be a discrete component. Baluns 122, 128 may be a model 750-0153 balun from Next Level Communications, Inc. of Rohnert Park, Calif.

Signal distribution as described herein results in a considerable decrease in the installation time and cost of digital services such as VDSL. Only network interface device 26 and those components located in rooms 72, 104 require installation. Existing coaxial cable 106, 108, 110 eliminates the need to string long twisted pair cabling 70 or additional coaxial cable 80, 84, 86 throughout customer premises 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for distributing data signals from a telecommunication network to at least one analog signal receiver within a customer premises comprising:
   a network interface device connected to receive digital data signals from the telecommunication network, the network interface device providing at least one network connection point to the customer premises;
   a first diplexer having an analog signal port, a digital signal port, and a combined signal port, the first diplexer passing analog signals between the analog signal port and the combined signal port and passing digital signals between the digital signal port and the combined signal port, the first diplexer digital signal port in communication with a connection point on the network interface device;
   a second diplexer having an analog signal port, a digital signal port, and a combined signal port, the second diplexer passing analog signals between the analog signal port and the combined signal port and passing digital signals between the digital signal port and the combined signal port, the second diplexer combined signal port in communication with the first diplexer combined signal port; and
   a gateway generating analog data signals from digital data signals received through a gateway digital input port, the analog data signals provided to a gateway analog output port, the gateway digital input port in communication with the second diplexer digital signal port and the gateway analog output port in communication with the second diplexer analog signal port;
   wherein analog signals are available to the at least one receiver at the first diplexer analog signal port and at the second diplexer analog signal port.

2. The system of claim 1 further comprising:
   a splitter operative to provide an analog signal received at a splitter input to each of at least two splitter outputs, the splitter input connected to the gateway analog output port and a first splitter output connected to the second diplexer analog signal port; and
   at least one analog signal receiver connected to a second splitter output.

3. The system of claim 1 further comprising:
   a splitter operative to provide an analog signal received at a splitter input to each of at least two splitter outputs, the splitter input connected to the first diplexer analog signal port; and
   a plurality of analog signal receivers, each analog signal receiver connected to a splitter output.

4. The system of claim 1 wherein the network interface device network connection point provides a twisted pair connection and wherein the first diplexer digital signal port accepts coaxial cable, the system further comprising a balun connected between the network connection point and the first diplexer digital signal port, the balun operative to interface twisted pair with coaxial cable.

5. The system of claim 1 wherein the gateway digital input port accepts a twisted pair connection and wherein the second diplexer digital signal port provides a coaxial cable connection, the system further comprising a balun connected between the gateway digital input port and the second diplexer digital signal port, the balun operative to interface twisted pair with coaxial cable.

6. The system of claim 1 wherein the digital data signals are VDSL signals and the analog signals are radio frequency signals.

7. A system for distributing analog video signals to a plurality of receivers within a customer premises wherein VDSL signals are provided to the customer premises over a first media form from a network interface device and wherein a gateway generates the analog video signals for distribution over a second media form from VDSL signals received over the first media form, the system comprising:
   a first interface means in communication with the network interface device, the first interface means accepting VDSL signals over the first media form and providing VDSL signals over the second media form;
   a first filtering means accepting VDSL signals at a digital signal port and providing the accepted VDSL signals at a combined signal port, the first filtering means further accepting analog video signals at the combined signal port and providing the accepted analog video signals at an analog signal port, the first filtering means in communication with the first interface means through the first filtering means digital signal port and in communication with at least one receiver through the first filtering means analog signal port;

a second filtering means accepting analog video signals at an analog signal port and providing the accepted analog video signals at a combined signal port, the second filtering means further accepting VDSL signals at the combined signal port and providing the accepted digital signals at a digital signal port, the second filtering means in communication with the first filtering means combined signal port through the second filtering means combined signal port;

a second interface means in communication with the second filtering means through the second filtering means digital signal port and in communication with the gateway, the second interface means accepting VDSL signals from the second interface means over the second media form and providing VDSL signals to the gateway over the first media form; and a splitter means in communication with the gateway, the second filtering means analog signal port, and at least one receiver, the splitter means accepting analog video signals from the gateway and providing the accepted analog video signals to the second filtering means and the at least one receiver.

8. A system as in claim 7 wherein the first media form is twisted pair wiring and wherein the second media form is coaxial cable.

9. A system as in claim 7 further comprising a second splitter means in communication with the first filtering means analog signal port and with a plurality of receivers, the second splitter means accepting analog video signals from the first filtering means and providing accepted analog video signals to the plurality of receivers.

10. A system for providing analog video signals within a customer premises wired with coaxial cable, the analog video signals based on VDSL signals supplied by a telecommunication network, the system comprising:

a network interface device accepting VDSL signals from the telecommunication network and providing the accepted VDSL signals in a media form different than coaxial cable;

a first balun in communication with the network interface device, the first balun accepting the VDSL signals in the media form and providing the accepted VDSL signals on coaxial cable;

a first diplexer having a digital signal port, an analog signal port, and a combined analog and digital signal port, the first diplexer digital signal port connected to the first balun through coaxial cable, the first diplexer analog signal port providing analog video signals;

a second diplexer having a digital signal port, an analog signal port, and a combined analog and digital signal port, the second diplexer combined signal port connected to the first diplexer combined signal port through coaxial cable;

a second balun in communication with the second diplexer digital signal port, the second balun accepting VDSL signals on coaxial cable and providing the accepted VDSL signals in the media form; and a gateway in communication with the second balun and the second diplexer analog signal port, the gateway generating analog video signals based on the VDSL signals received from the second balun.

11. A system as in claim 10 further comprising a splitter inserted between the gateway and the second diplexer analog signal port, the splitter having an output providing analog video signals.

12. A system as in claim 10 further comprising a splitter in communication with the first diplexer analog signal port, the splitter having a plurality of outputs, each output providing analog video signals.

13. A system as in claim 10 wherein the media form is twisted pair wiring.

14. A method of distributing information signals from a telecommunication network to at least one analog signal receiver within a customer premises, the method comprising:

receiving high frequency information signals formatted for a first medium;

formatting the received signals for a second medium;

transmitting the formatted signals over existing cabling of the second medium;

converting the transmitted signals for the first medium;

decoding the high frequency signals into analog signals; and transmitting the analog signals over the existing cabling of the second medium.

15. A method of distributing information signals as in claim 14 wherein the high frequency signals are digital signals.

16. A method of distributing information signals as in claim 15 wherein the high frequency signals are VDSL signals.

17. A method of distributing information signals as in claim 14 further comprising filtering out the high frequency signals and sending the analog signals over existing cabling.

18. A method of distributing information signals as in claim 14 wherein the first medium is twisted pair wiring and the second medium is coaxial cabling.

19. A method of reusing cabling within customer premises to distribute information signals from a telecommunication network to at least one analog signal receiver, the method comprising:

connecting a first diplexer to receive the information signals through a digital signal port of the first diplexer;

connecting a second diplexer to the first diplexer, the connection between a combined signal port on the first diplexer and a combined signal port on the second diplexer;

connecting a gateway input to a digital signal port on the second diplexer;

connecting the gateway output to an analog signal port on the second diplexer; and connecting existing cabling to at least one of the gateway output, an analog signal port on the first diplexer, and the second diplexer analog signal port;

whereby at least one analog receiver can be connected to existing cabling to receive analog signals.

\* \* \* \* \*